United States Patent
Kwon et al.

(10) Patent No.: US 11,648,931 B2
(45) Date of Patent: May 16, 2023

(54) VEHICLE RUNNING MODE CONTROL METHOD AND HYBRID ELECTRIC VEHICLE FOR IMPROVING MHSG EFFICIENCY

(71) Applicants: HYUNDAI MOTOR COMPANY, Seoul (KR); KIA MOTORS CORPORATION, Seoul (KR)

(72) Inventors: Oh-Eun Kwon, Hwaseong-si (KR); Sun-Young Park, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 290 days.

(21) Appl. No.: 16/995,421

(22) Filed: Aug. 17, 2020

(65) Prior Publication Data
US 2021/0253084 A1    Aug. 19, 2021

(30) Foreign Application Priority Data
Feb. 17, 2020    (KR) .................. 10-2020-0018888

(51) Int. Cl.
| | | |
|---|---|---|
| B60W 10/10 | (2012.01) | |
| B60W 20/30 | (2016.01) | |
| B60W 20/40 | (2016.01) | |
| B60W 10/08 | (2006.01) | |

(Continued)

(52) U.S. Cl.
CPC ............ B60W 20/30 (2013.01); B60W 10/02 (2013.01); B60W 10/06 (2013.01); B60W 10/08 (2013.01); B60W 10/10 (2013.01); B60W 20/40 (2013.01); B60W 2510/0638 (2013.01); B60W 2510/081 (2013.01); B60W 2710/021 (2013.01); B60W 2710/0644 (2013.01); B60W 2710/1005 (2013.01)

(58) Field of Classification Search
CPC .......... B60W 2030/203; B60W 20/30; B60W 10/02; B60W 10/06; B60W 10/08; B60W 10/10; B60W 20/40; B60W 2510/0638; B60W 2510/081; B60W 2710/0644; B60W 2710/1005; B60W 2710/1001; B60W 2510/0241; B60W 2710/021; B60W 2720/10
USPC .......................................................... 477/5
See application file for complete search history.

(56) References Cited

U.S. PATENT DOCUMENTS

| | | | | |
|---|---|---|---|---|
| 2007/0056783 A1* | 3/2007 | Joe | ............................ | B60L 7/14 180/65.265 |
| 2013/0304296 A1* | 11/2013 | Ueda | ..................... | B60W 10/10 180/65.265 |
| 2015/0134173 A1* | 5/2015 | Choi | ..................... | B60W 10/06 180/65.265 |

FOREIGN PATENT DOCUMENTS

| | | | |
|---|---|---|---|
| JP | 2013136326 A | * | 7/2013 |
| JP | 2015107697 A | * | 6/2015 |
| KR | 10-2010-0063308 A | | 6/2010 |

OTHER PUBLICATIONS

English translation of JP2013136326A; http://translationortal.epo.org; Jun. 22, 2022 (Year: 2022).*

* cited by examiner

*Primary Examiner* — Roger L Pang
(74) *Attorney, Agent, or Firm* — Fox Rothschild LLP

(57) ABSTRACT

A vehicle running mode control method may include detecting, by a mode controller, a mode switching from an electric vehicle mode (EV mode) to a hybrid electric vehicle mode (HEV mode) while a vehicle runs; and performing a continuously variable transmission (CVT) cooperative mode (Continued)

switching control in which a drive motor is connected to an engine by engaging a clutch by operating the CVT.

15 Claims, 3 Drawing Sheets

(51) Int. Cl.
    *B60W 10/02*     (2006.01)
    *B60W 10/06*     (2006.01)

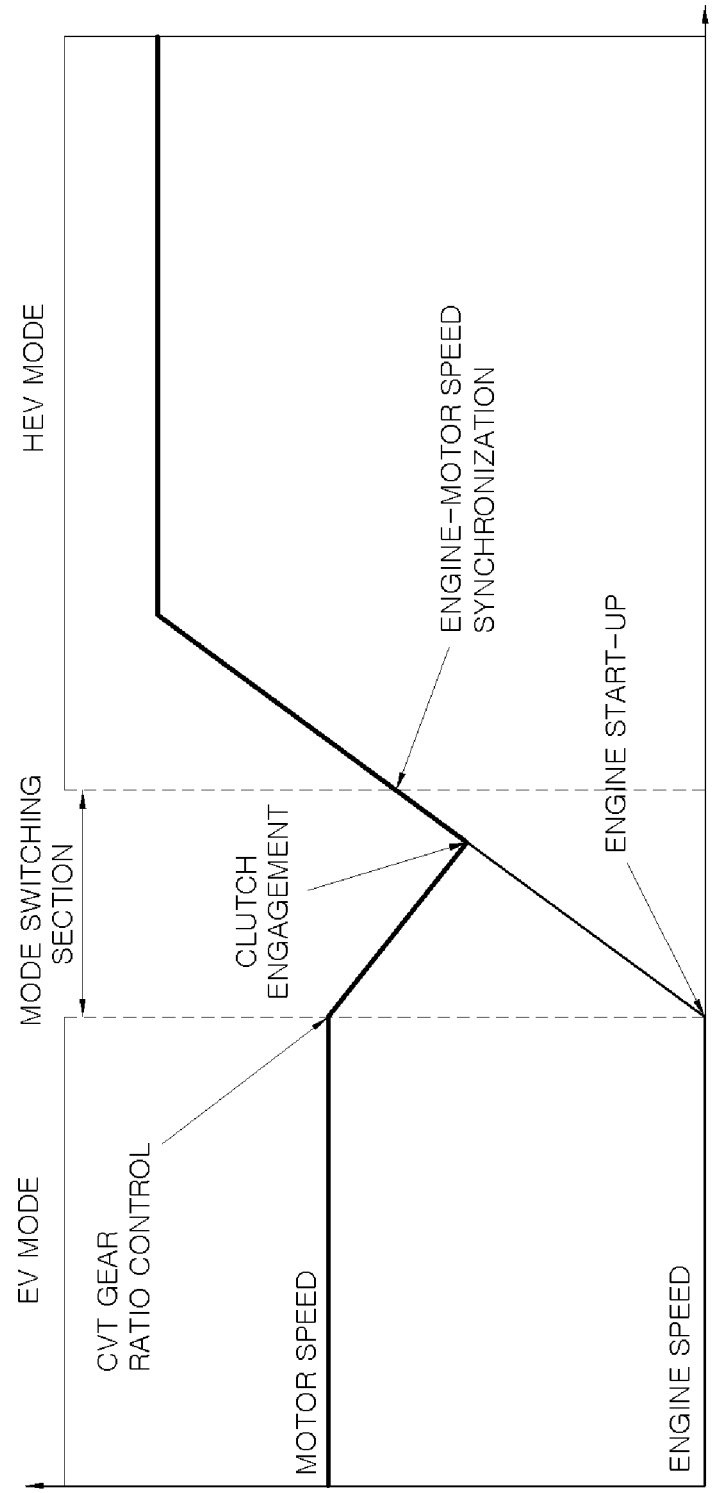

VEHICLE RUNNING MODE CONTROL METHOD AND HYBRID ELECTRIC VEHICLE FOR IMPROVING MHSG EFFICIENCY

CROSS-REFERENCE TO RELATED APPLICATION

This application claims priority to and the benefit of Korean Patent Application No. 10-2020-0018888, filed on Feb. 17, 2020, the entire contents of which are incorporated herein by reference.

FIELD

The present disclosure relates to vehicle running mode control of a 48V P2 system, and more particularly, to a hybrid electric vehicle, which decrease (or lowers) a motor speed (or a motor RPM) in a vehicle speed maintenance state in connection with a gear ratio when a running mode is switched from an electric vehicle (EV) mode to a hybrid electric vehicle (HEV) mode, thereby improving Mild Hybrid Starter & Generator (MHSG) efficiency.

BACKGROUND

The statements in this section merely provide background information related to the present disclosure and may not constitute prior art.

Generally, a Mild Hybrid Electric Vehicle among Hybrid Electric Vehicles applies a Mild Hybrid Starter & Generator (MHSG) system (typically, 48V MHSG system) of a MHSG, a 48V battery, and a Low Voltage DC/DC Converter (LDC) together with a gasoline/diesel engine.

In such a mild hybrid electric vehicle, the MHSG, engine, engine clutch, motor, Continuously Variable Transmission (CVT), and drive system which assist the start-up and torque of the engine are characterized by the 48V P2 system. In this case, the MHSG is connected to the engine by a belt, a gear, and the like to transmit power, and is responsible for starting the engine when the mode is switched from a stop state or an Electric Vehicle Mode (EV mode) to a Hybrid Electric Vehicle Mode (HEV mode).

Accordingly, the 48V P2 system may control the engine clutch between the engine and the motor, thereby implementing the EV mode and the HEV mode independently, and particularly, may also drive the engine and the motor at the optimum point of the most efficiency by using the characteristic of the CVT in which the gear ratio is continuously changed.

However, we have discovered that the 48V P2 system requires a relatively long time for a mode switching from the EV mode to the HEV mode because the EV mode is switched to the HEV mode by increasing the engine speed until the engine speed is synchronized with the motor speed and then the engaging the engine clutch. Accordingly, switching from the EV to HEV mode in the 48V P2 system disadvantageously affects the aspects of the State Of Charge (SOC) and fuel efficiency of the battery.

SUMMARY

The present disclosure provides a vehicle running mode control method and a hybrid electric vehicle for improving MHSG efficiency, which may decrease (or lowers) a motor speed (or a motor RPM) so as to reduce the power desired for a MHSG in a state where a vehicle speed is kept as it is in connection with a gear ratio of a Continuously Variable Transmission (CVT) when the mode is switched from an EV mode to a HEV mode, thereby improving the MHSG efficiency of a 48V P2 system, and particularly, may quickly perform the engagement of an engine clutch based on the mode switching by reducing the motor speed to reduce the time desired for the mode switching, thereby improving the aspects of the SOC and fuel efficiency of a battery.

In one form of the present disclosure, a vehicle running mode control method includes: detecting, by a mode controller, a mode switching while a vehicle runs; determining, by the mode controller, whether the mode switching from an electric vehicle mode (EV mode) to a hybrid electric vehicle mode (HEV mode) occurs; and when the mode switching is determined, performing, by the mode controller, a CVT cooperative mode switching control, in which the mode switching is confirmed from an EV mode to a HEV mode, a drive motor is connected to an engine by engaging a clutch with an operation of a CVT, a motor Revolution Per Minute (RPM) of the drive motor is decreased by the operation of a Continuously Variable Transmission (CVT), and the motor RPM is synchronized with the engine.

In one form of the present disclosure, the operation of the CVT is in a CVT gear ratio control state where a vehicle speed is kept, is performed in a mode switching section of the EV mode and the HEV mode, and is started at the end time point of the EV mode.

In another form, the CVT cooperative mode switching control is performed as entering the mode switching by confirming the switching from the EV mode to the HEV mode, performing a CVT gear ratio control by operating the CVT, driving the engine, and performing a clutch engagement by controlling the clutch to the engine and the drive motor are connected.

In other form, the CVT gear ratio control is classified into not operating the CVT which excludes an OOL from a shift line diagram so that the CVT control is not performed and operating the CVT which performs the CVT control.

In some forms of the present disclosure, the not operating of the CVT drives the engine by excluding the OOL, and the operating of the CVT is a CVT upshift which is performed by an Over Drive (OD) for the upshift of the CVT gear ratio.

In some forms of the present disclosure, an engine Revolution Per Minute (RPM) is increased until the engine RPM reaches the motor RPM to become a synchronization state.

In addition, a hybrid electric vehicle according to the present disclosure for achieving the object includes a mode controller which engages a clutch after a motor a motor Revolution Per Minute (RPM) of a drive motor is synchronized with an engine Revolution Per Minute (RPM) in a state where the motor RPM of a drive motor is decrease (or lowered) relative to an EV mode under a gear ratio control of a CVT, when a mode is switched from the EV mode to a HEV mode while a vehicle runs in the EV mode.

In some forms of the present disclosure, the mode controller performs the upshift by an OD, which is started at the end time point of the EV mode, so that a vehicle speed is kept in a CVT gear ratio control state.

In another form, the mode controller does not operate the CVT control in the shift line diagram of the OOL.

In other form, the mode switching engages the clutch in a state where the motor RPM of the drive motor is decrease so that the SOC and fuel efficiency of a battery are improved by the time desired for the mode switching.

In some forms of the present disclosure, the drive motor is applied between the engine and the CVT to configure a 48V P2 system in which a MHSG system is connected to the engine, and MHSG efficiency of the MHSG system is improved by the level at which the motor RPM of the drive motor is decrease in a state where a vehicle speed is kept upon the mode switching.

The vehicle running mode control for improving the MHSG efficiency which is applied to the hybrid electric vehicle according to the present disclosure implements the following operations and effects.

Firstly, it is possible to improve the MHSG efficiency of the 48V P2 system vehicle among the hybrid electric vehicles in connection with the CVT in the running mode switching. Secondly, the MHSG efficiency may be improved by decreasing (or lowering) only the motor speed (or a motor RPM) without changing the vehicle speed under a control of the gear ratio of the CVT, thereby expecting the effect of increasing the fuel efficiency relative to the entire path by reducing the power desired for the MHSG. Thirdly, it is possible to synchronize the engine speed and the motor speed more quickly by reducing the motor speed, thereby reducing the time desired for the mode switching. Fourthly, it is possible to quickly engage the engine clutch by reducing the time desired for the mode switching, thereby improving the aspects of the SOC and fuel efficiency of the battery.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a diagram illustrating an operating state of the 48V P2 system which switches a mode from an EV mode to a HEV mode according to one form of the present disclosure.

Figure 1:
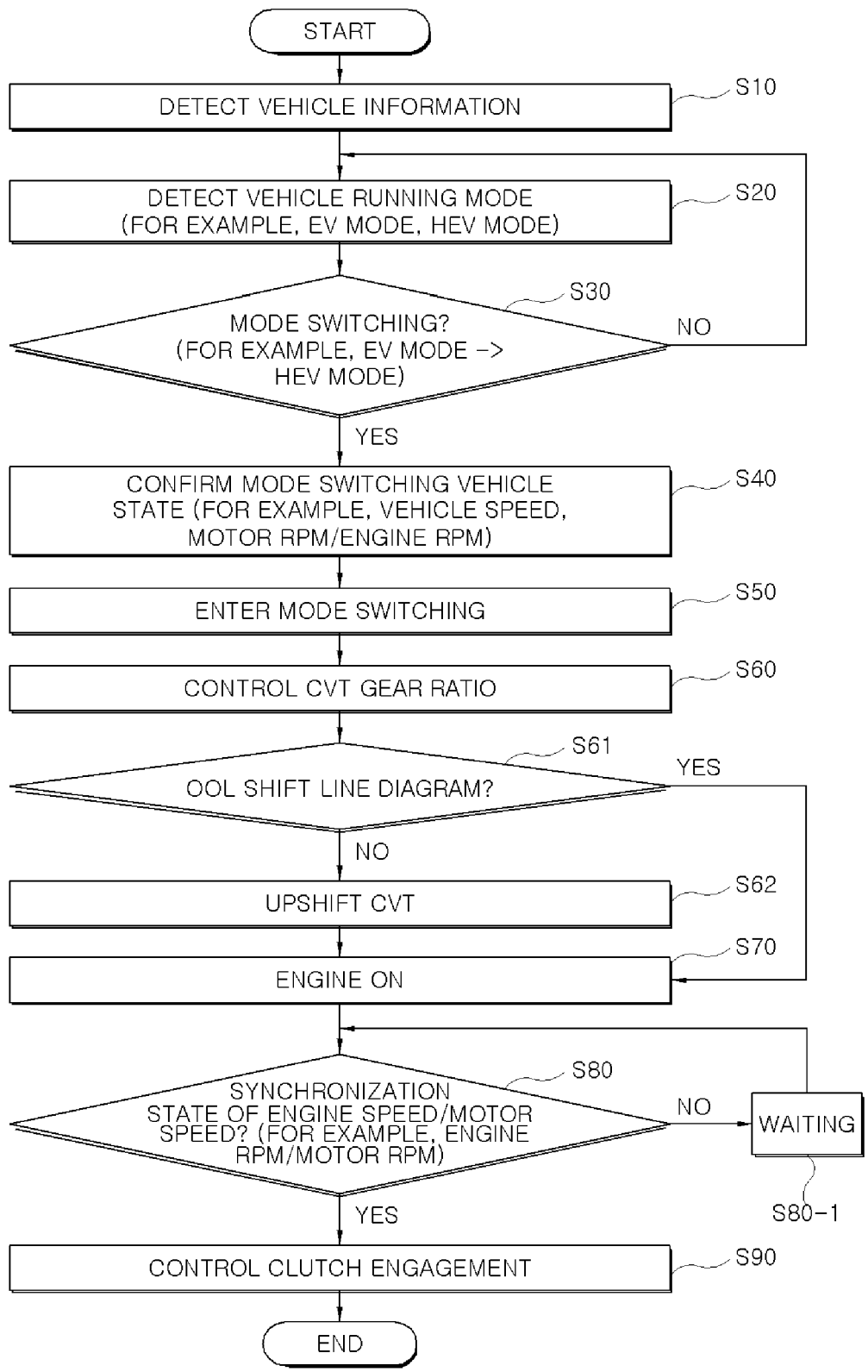
FIG. 1 is a flowchart illustrating a running mode control method for improving MHSG efficiency according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a vehicle running mode control method improves Mild Hybrid Starter & Generator (MHSG) efficiency under a Continuously Variable Transmission (CVT) cooperative mode switching control (S40 to S90) which switches a running mode by operating the CVT before a clutch is engaged in confirming a vehicle running mode switching conditions (S10 to S30) which are switched from an EV mode, in which a drive motor drives a vehicle, to a HEV mode, in which an engine drives the vehicle.

Particularly, the CVT cooperative mode switching control (S40 to S90) forcibly upshifts a CVT gear ratio by an Over Drive (OD) while excluding a gear ratio control based on an Optimal Operating Line (OOL), such that the clutch is engaged after the engine speed is increase until the engine speed is synchronized with the motor speed.

Accordingly, the vehicle running mode control method may decrease (or low) only the speed (or a motor RPM) of the driving motor in a state where the vehicle speed is kept by controlling the CVT gear ratio based on the upshift of the OD when the mode is switched from the EV mode to the HEV mode, thereby being characterized as a vehicle running mode control method for improving MHSG efficiency unlike the conventional EV to HEV mode switching method.

Therefore, the vehicle running mode control method for improving the MHSG efficiency may decreasing (or lowering) only the motor speed (or a motor RPM) of the drive motor in a state where the vehicle speed is kept, thereby implementing the effect of reducing the engine speed desired for engaging the engine clutch, and as a result, the effect may reduce the power desired for the MHSG so that the engine clutch is quickly engaged, thereby reducing the time desired for the mode switching by the reduced power level and being beneficial even in the aspects of the SOC and fuel efficiency.

Figure 2:
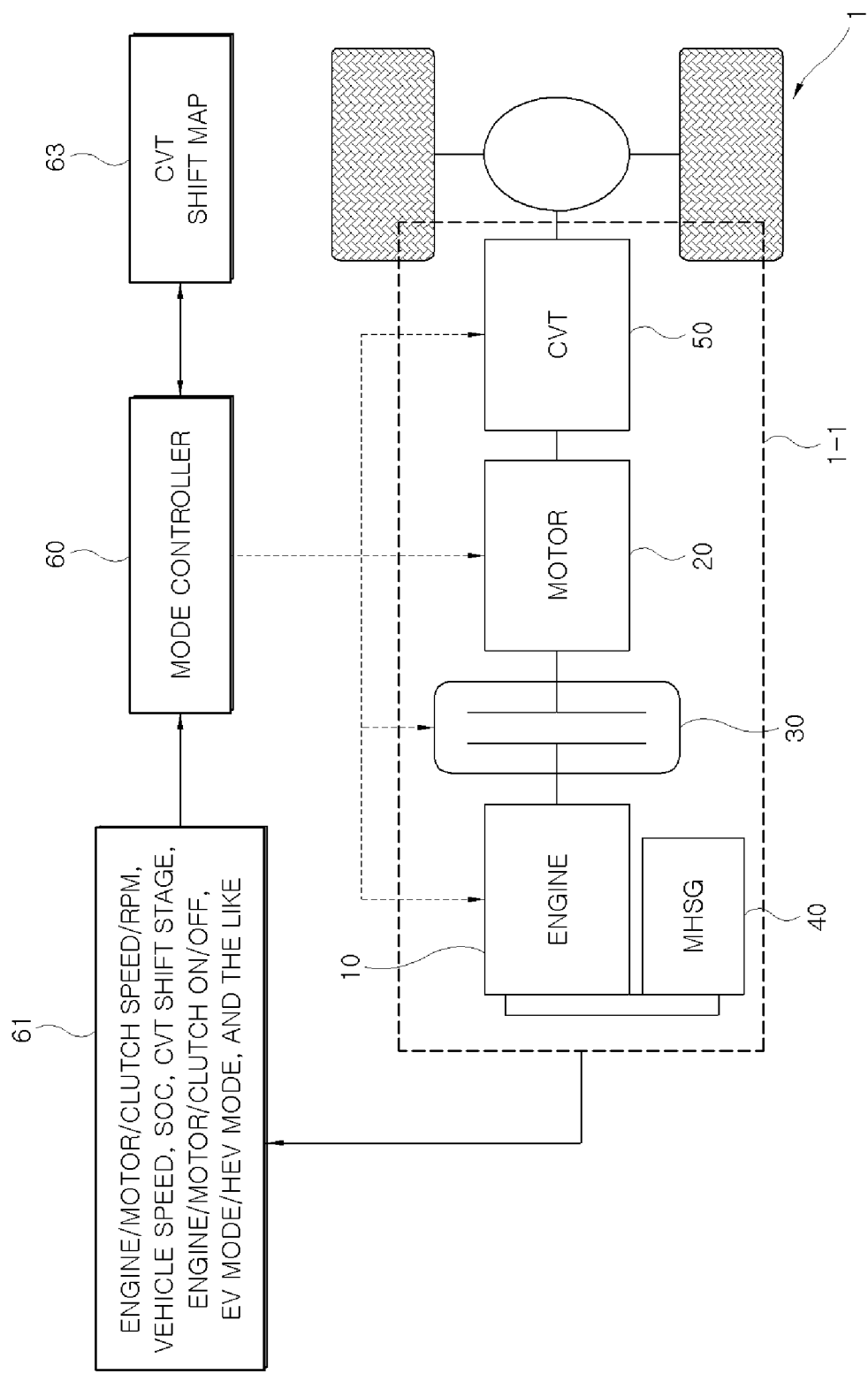
FIG. 2 is a diagram illustrating an example of a hybrid electric vehicle which applies a 48V P2 system capable of improving MHSG efficiency under a running mode control according to one form of the present disclosure.

Meanwhile, FIG. 2 illustrates an example of a hybrid electric vehicle 1, and the hybrid electric vehicle 1 is a mild hybrid electric vehicle, which adapts a 48V P2 system 1-1 in which a drive motor 20 is applied between an engine 10 and a CVT 50 while connecting the engine with a MHSG system. However, the hybrid electric vehicle 1 may be a mild hybrid electric vehicle of a PO type in which the engine 10 and the drive motor 20 are connected to an engine pulley by a belt, a P3 type mounted with the CVT 50, or a P4 type mounted with wheels.

For example, the 48V P2 system 1-1 includes an internal combustion engine type engine 10, an electric motor type drive motor 20, a clutch 30 configured to connect the engine 10 with the drive motor 20, a Mild Hybrid Starter & Generator (MHSG) 40 which assists engine start-up and torque, Primary/Secondary Pulleys which are connected to a power shaft, a CVT 50, and a mode controller 60 which switch a shift stage by transmitting power to the belt.

Specifically, the mode controller 60 stores a program or an algorithm for the CVT cooperative mode switching control (S40 to S90) into a memory, and operates as a Central Processing Unit (CPU) which executes the program or the algorithm. To this end, the mode controller 60 includes a data processor 61 and a shift map 63. The data processor 61 provides, as input data, the mode controller 60 with engine/motor/clutch speed/RPM, vehicle speed, SOC, CVT shift stage, engine/motor/clutch ON/OFF, EV/HEV mode, and the shift map 63 provides the mode controller 60 with a motor/engine CVT shift line diagram which includes an Optimal Operating Line (OOL).

Hereinafter, the vehicle running mode control method for improving the MHSG efficiency of FIG. 1 will be described in detail with reference to FIGS. 2 and 3. In this case, it will be described that the control subject is the mode controller 60, and the control target is the engine 10, the drive motor 20, the clutch 30, and the CVT 50, or the clutch 30 and the CVT 50 of the 48V P2 system 1-1.

First, the mode controller 60 performs the confirming of the vehicle running mode switching conditions (S10 to S30) as detecting vehicle information (S10), detecting a vehicle running mode (S20), and determining a mode switching (S30).

Referring to FIG. 2, the mode controller 60 performs the detecting of the vehicle information (S10) by reading, as input data, the engine/motor/clutch speed/RPM, vehicle speed, SOC, CVT shift stage, engine/motor/clutch ON/OFF, EV/HEV mode of the data processor 61.

Subsequently, the mode controller 60 performs the detecting of the vehicle running mode (S20) by changing the vehicle speed, SOC, motor speed, motor RPM, EV mode, and the like among the input data, and accordingly, performs the determining of the mode switching (S30) by confirming the switching from the EV mode to the HEV mode.

Subsequently, the mode controller 60 performs the CVT cooperative mode switching control (S40 to S90) as confirming a mode switching vehicle state (S40), entering the mode switching (S50), controlling a CVT gear ratio (S60), driving an engine (engine ON) (S70), determining an engine/motor speed synchronization state (S80), and controlling a clutch engagement (S90).

Referring to FIG. 2, the mode controller 60 performs the confirming of the mode switching vehicle state (S40) by confirming the vehicle speed, the motor RPM, the engine RPM, the CVT shift stage, and the like among the input data. Subsequently, the mode controller 60 performs the entering of the mode switching (S50) by switching an EV mode control state to a HEV mode control state.

Specifically, the mode controller 60 performs the controlling of the CVT gear ratio (S60) as confirming an OOL shift line diagram (S61) and confirming a CVT upshift (S62). For example, the confirming of the OOL shift line diagram (S61) is for maintaining an optimization line diagram effect of the engine 10 and the drive motor 20. Accordingly, the mode controller 60 switches the process to the driving of the engine (engine ON) (S70) without the gear ratio control of the CVT 50 in the Optimal Operating Line (OOL) of the engine 10 and the drive motor 20 when the EV mode is switched to the HEV mode while the vehicle runs in the EV mode.

On the other hand, the performing of the CVT upshift (S62) makes the gear ratio of the CVT into a forced upshift state by an Over Drive under a forced gear ratio control when the EV mode is switched to the HEV mode while the vehicle 1 runs in the EV mode. Accordingly, in order to decrease (or lower) the engine speed (or an engine RPM) desired for engaging the clutch 30, the mode controller 60 may control the CVT gear ratio to decrease (or lower) the motor speed (or a motor RPM) of the drive motor 20 in a state where the speed of the vehicle 1 is kept as it is, thereby reducing the power desired for the MHSG 40.

For example, the driving of the engine (S70) switches the engine 10 which is in the stop state (engine OFF) to the driving state (engine ON) in the EV mode.

Referring to FIG. 3, the performing of the CVT upshift (S62) by the mode controller 60 is illustrated. As illustrated, the mode controller 60 reads the shift map 63 to confirm the CVT shift line diagram for the HEV mode control, and starts the CVT gear ratio control (S60) in a mode switching section of the EV mode and the HEV mode.

Subsequently, the mode controller 60 forcibly upshifts the gear ratio of the CVT by the Over Drive in the performing of the CVT upshift (S62) with being not in the OOL condition in the confirming of the OOL shift line diagram (S61). In one form, the Over Drive applies about 2,000 RPM. In this case, the CVT operation by the performing of the CVT upshift (S62) starts at the end time point of the EV mode where the EV mode is switched to HEV mode and thus, is performed in the mode switching section. Therefore the end time point of the EV mode means a start time point of the CVT operation in a mode switching section of the EV mode and the HEV mode.

Then, as in the mode switching section, the drive motor 20 decrease (or lowers) the motor RPM of the EV mode by the CVT forced upshift whereas the engine 10 increases the engine RPM by driving the engine, thereby quickly forming a motor-engine RPM contact region. In this case, the motor-engine RPM contact region means a region which enables the contact of the clutch 30.

Referring back to FIG. 2, the mode controller 60 increases the engine RPM of the engine 10 until the engine RPM of the engine 10 reaches the motor RPM of the drive motor 20 and then controls the clutch 30, such that the engine 10 and the drive motor 20 are connected.

Accordingly, the determining of the engine/motor speed synchronization state (S80) is performed by the engine RPM of the engine 10 reaching the motor-engine RPM contact region after a waiting time (S80-1), and the controlling of the clutch engagement (S90) is performed while the engine RPM and the motor RPM are matched, thereby implementing the synchronization between the engine 10 and the drive motor 20 without the clutch OPEN/SLIP.

Finally, the mode controller 60 controls the vehicle 1 by setting the running mode to the HEV mode.

As described above, the vehicle running mode control method for improving the MHSG efficiency which is applied to the hybrid electric vehicle 1 according to the present form engages the clutch 30 after the motor RPM is synchronized with the engine RPM by driving the engine 10 in the state where the motor RPM of the drive motor 20 is decreased (or lowered) relative to the EV mode under the gear ratio control of the Continuously Variable Transmission (CVT), when the EV mode is switched to the Hybrid Electric Vehicle Mode (HEV mode) by the mode controller 60 while the vehicle 1 runs in the Electric Vehicle Mode (EV mode), thereby decreasing (or lowering) only the motor speed (or a motor RPM) of the drive motor 20 in a state where the vehicle speed is kept as it is to improve the MHSG efficiency of the 48V P2 system, and also reducing the time desired for the mode switching from the EV to the HEV to improve the aspects of the SOC and fuel efficiency of the battery.

What is claimed is:

1. A vehicle running mode control method of a vehicle, the method comprising:
   detecting, by a mode controller, a mode switching while a vehicle runs;
   determining, by the mode controller, whether the mode switching from an electric vehicle mode (EV mode) to a hybrid electric vehicle mode (HEV mode) occurs; and
   when the mode switching is determined, performing, by the mode controller, a continuously variable transmission (CVT) cooperative mode switching control in which a drive motor of the vehicle is connected to an engine of the vehicle by engaging a clutch while operating the CVT;
   performing, by the mode controller, an upshift of a CVT when the EV mode is switched to the HEV mode;
   wherein the upshift is started simultaneously as the engine is started.

2. The method of claim 1, wherein connecting the drive motor to the engine includes:
   decreasing revolutions per minute (RPM) of the drive motor by operating the CVT, and
   synchronizing the RPM of the drive motor with an engine RPM of the engine.

3. The method of claim 1, wherein in operating the CVT, a gear ratio of the CVT is controlled to maintain a vehicle speed of the vehicle.

4. The method of claim 1, wherein in operating the CVT, the CVT starts at an end time point of the EV mode when the EV mode is switched to the HEV mode.

5. The method of claim 1, wherein the CVT cooperative mode switching control comprises:
    entering the mode switching by confirming the switching from the EV mode to the HEV mode;
    performing a CVT gear ratio control by operating the CVT;
    driving the engine; and
    performing a clutch engagement by controlling the clutch.

6. The method of claim 5, wherein the CVT gear ratio control comprises:
    excluding an optimal operating line (OOL) from a shift line diagram in a CVT control, and performing the CVT control.

7. The method of claim 6, wherein the engine is driven when the OOL is excluded.

8. The method of claim 6, wherein the CVT is operated with an over drive (OD) to upshift a CVT gear ratio.

9. The method of claim 5, wherein an engine RPM is increased to reach an RPM of the drive motor to become a synchronization state by driving the engine.

10. A hybrid electric vehicle comprising:
    a mode controller configured to:
        determine whether an electric vehicle mode (EV mode) is changed to a hybrid electric vehicle mode (HEV mode);
        when the EV mode is changed to HEV mode, perform a gear ratio control of a continuously variable transmission (CVT) to decrease revolutions per minute (RPM) of a drive motor;
        operate an engine to synchronize an engine RPM with the RPM of the drive motor; and
        engage a clutch after the engine RPM and the RPM of the drive motor are synchronized;
    wherein an upshift of the CVT is performed when the EV mode is changed to the HEV mode; and
    wherein the upshift is started simultaneously as the engine is started.

11. The hybrid electric vehicle of claim 10, wherein the mode controller is configured to perform the upshift with an over drive (OD) so that a vehicle speed is kept in a CVT gear ratio control state.

12. The hybrid electric vehicle of claim 10, wherein the mode controller does not perform a CVT control in a shift line diagram of an optimal operating line (OOL).

13. The hybrid electric vehicle of claim 10, wherein the clutch is engaged in a state where the RPM of the drive motor is decreased.

14. The hybrid electric vehicle of claim 10, wherein the drive motor is arranged between the engine and the CVT to configure a 48V P2 system, and wherein the 48V P2 system includes the engine, the drive motor, the clutch, a mild hybrid starter & generator (MHSG) which assists the start-up and torque of the engine, and the CVT.

15. The hybrid electric vehicle of claim 14, wherein the engine is connected with the mild hybrid starter & generator (MHSG) system, and the RPM of the drive motor is decreased while a vehicle speed is maintained.

* * * * *